United States Patent [19]
Clune

[11] Patent Number: 5,774,253
[45] Date of Patent: Jun. 30, 1998

[54] COMPACT WINDOW VIEWING SYSTEM

[75] Inventor: Lavern Charles Clune, Huntsville, Ala.

[73] Assignee: Lockheed Martin Corporation, Sunnyvale, Calif.

[21] Appl. No.: 738,325

[22] Filed: Oct. 25, 1996

[51] Int. Cl.⁶ .................................................. G02B 26/08
[52] U.S. Cl. ......................... 359/226; 359/223; 359/894
[58] Field of Search .................................... 359/196, 197, 359/212–214, 220, 221, 223, 226, 831, 837, 876, 894, 900, 592

[56] References Cited

U.S. PATENT DOCUMENTS 4,955,693  9/1990  Bobba ...................................... 359/212

Primary Examiner—James Phan
Attorney, Agent, or Firm—Feix & Feix

[57] ABSTRACT

A wedge window changes the direction of radiation passing through the window to shorten the window required for unvignetted viewing. An orthogonal reflection pointing mirror reduces the window size that is required for unvignetted viewing through a window over a finite range of viewing angles. A wedge window is used in combination with an orthogonal reflection pointing mirror to reduce the window size that is required for unvignetted viewing over a finite range of viewing angles that includes large incidence angles.

4 Claims, 3 Drawing Sheets

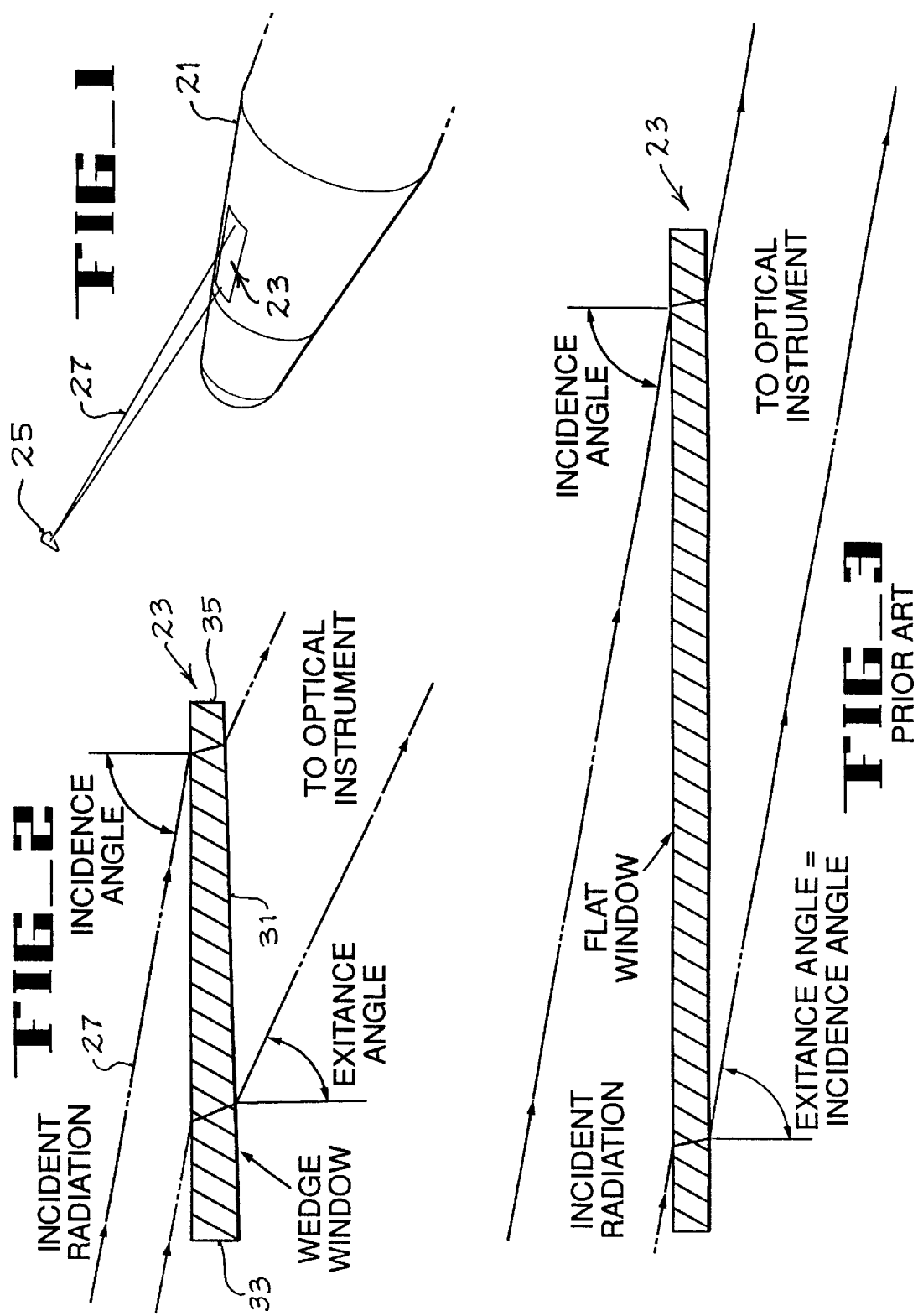

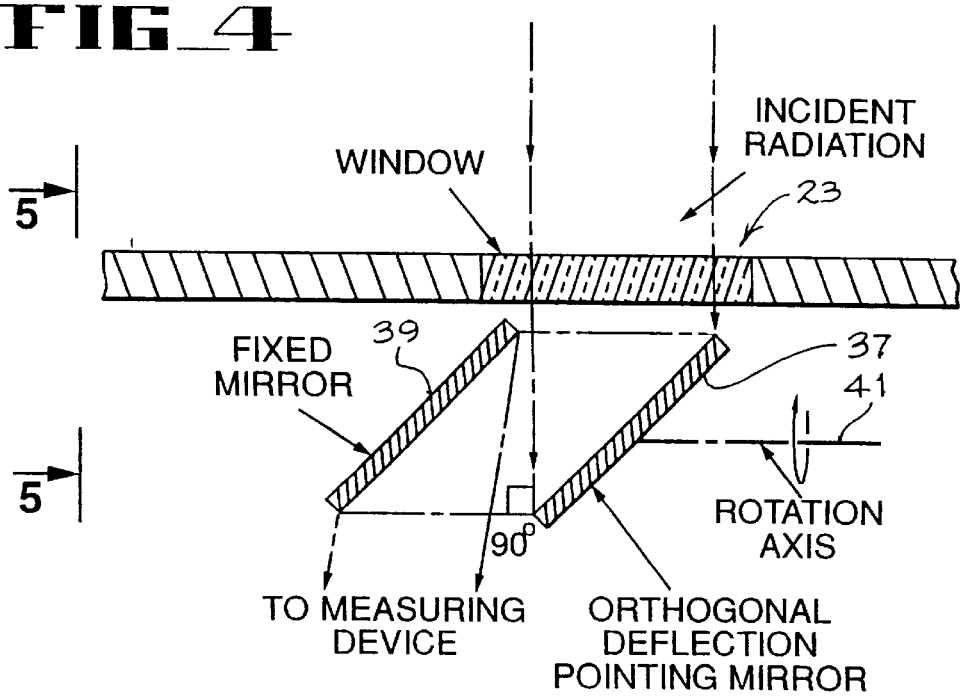
FIG_4
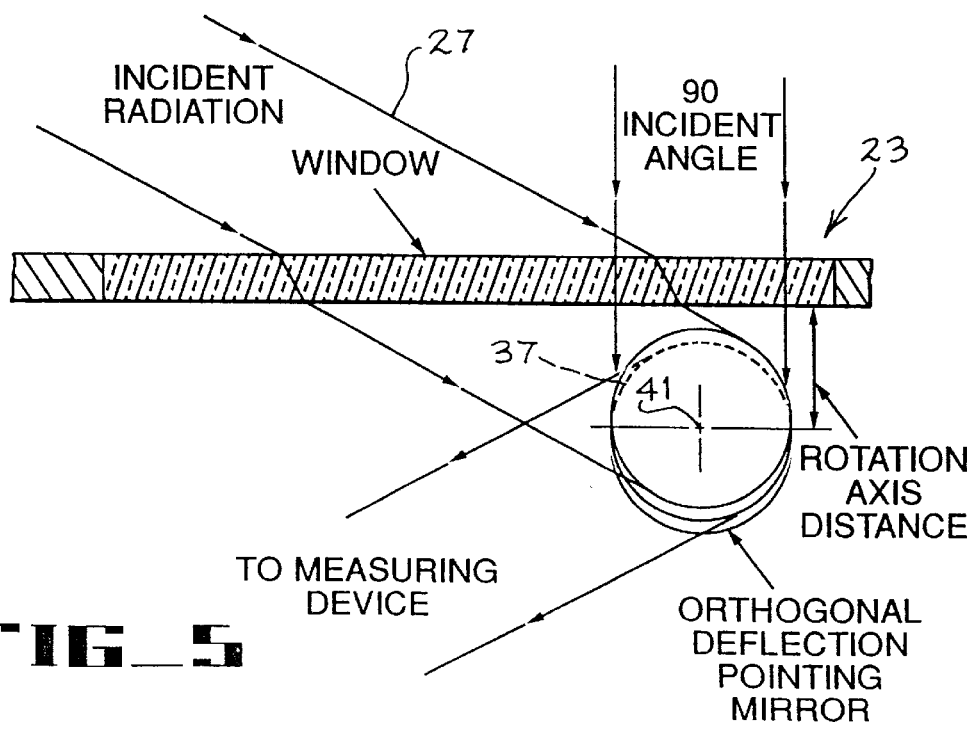
FIG_5

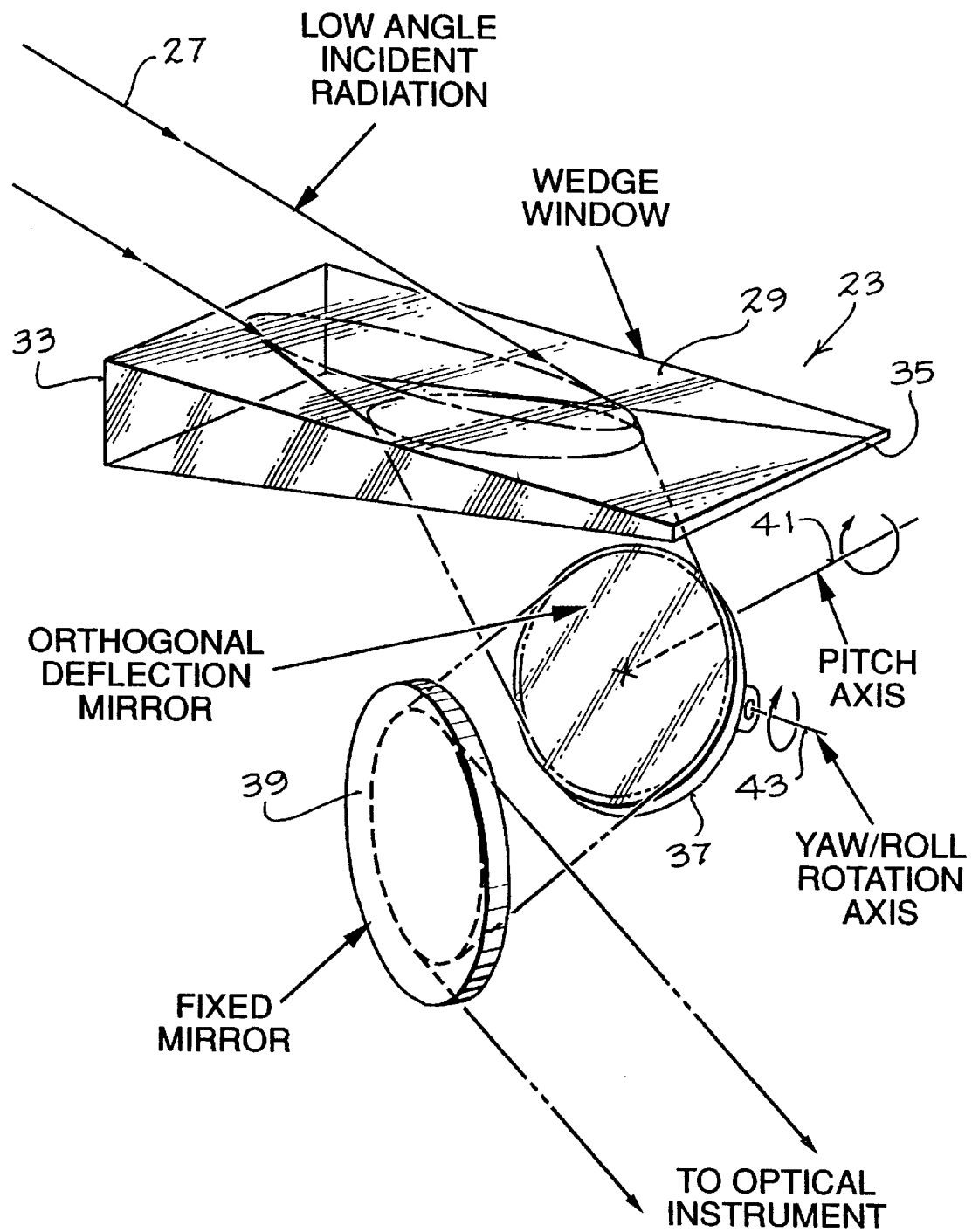
FIG_6

COMPACT WINDOW VIEWING SYSTEM

BACKGROUND OF THE INVENTION

This invention relates to methods and apparatus for processing radiation information which may be received over a finite range of incidence angles, including large incidence angles, with respect to a viewing window or opening.

This invention relates particularly to a wedge window configuration for changing the direction of radiation passing through the window to shorten the length of the window required for unvignetted viewing through the window at large angles of incidence.

This invention also relates particularly to an orthogonal reflection pointing mirror which reduces the window size that is required for unvignetted viewing through the window over a finite range of viewing angles.

Radiation information which is received at a large angle of incidence with respect to a viewing window can present problems in processing such radiation information.

For any optical instrument with finite aperture size to view through the window without vignetting, the required window clear aperture is proportional to the sine of the exitance angle. Where the exitance angle is large, the window size must be correspondingly large.

When the incident radiation is received at a small angle of inclination, the incidence angle (the angle of the radiation with respect to a line normal to the plane of the window surface) is large.

With a flat window (a window having a uniform thickness) as used in the prior art, the exitance angle is equal to the incidence angle. The exitance angle is therefore quite large for radiation received at a small angle of inclination (high incidence angle) with respect to the viewing window.

It is an object of the present invention to change the direction of radiation passing through the window to shorten the window required for unvignetted viewing.

It is a specific object of the present invention to use a wedge window for changing the direction of radiation and to configure the wedge shape with respect to the inclination of the incoming radiation so that (1) the radiation exits the wedge shaped window at an exitance angle which is smaller than the incidence angle at which the radiation enters the wedge-shaped window and (2) the amount of the change increases as the angle of incidence on the window surface is increased.

It is another object of the present invention to reduce the window size that is required to provide unvignetted viewing through the window over a finite range of viewing angles by using an orthogonal reflection mirror. The geometry allows the pointing mirror to remain close to the viewing window independent of the viewing angle.

It is a specific object of the present invention to reflect the radiation through ninety degrees in a direction parallel to the rotation axis of the mirror.

It is another object of the present invention to utilize a reflection geometry which allows a pointing mirror to always be oriented forty-five degrees to the incident and reflected radiation, even as the pointing mirror rotates about an axis perpendicular to the incident radiation to provide different viewing angles.

SUMMARY OF THE INVENTION

In one embodiment of the present invention a wedge window changes the direction of radiation passing through the window to shorten the window required for unvignetted viewing through the window at a large angle of incidence; and an orthogonal reflection pointing mirror reduces the window size that is required for unvignetted viewing through the window over a finite range of viewing angles.

The wedge window comprises a first flat window surface, a second flat window surface and a wedge between the first and the second surfaces. One end of the window has a greater thickness than the other end of the window, and the thickness of the window decreases linearly with increasing distance from the thicker end of the window.

Radiation incident upon the first flat window surface in the direction of decreasing thickness of the window is caused to exit the second flat window surface at an exitance angle which is smaller than the incidence angle at which the radiation enters the first flat window surface.

This changes the direction of radiation passing through the window and also increases the amount of said change as the angle of incidence on said first flat window surface is increased.

An orthogonal reflection pointing mirror is positioned to receive and to reflect radiation transmitted through a window opening. The mirror reflects the radiation through 90 degrees in a direction parallel to the rotation axis of the mirror. The reflection geometry allows the pointing mirror to always be oriented 45 degrees to the incident and reflected radiation even as it rotates about an axis perpendicular to the incident radiation to provide different viewing angles. The constant 45 degree orientation of the pointing mirror relative to the incident and reflected radiation allows the mirror to be located as close as possible to the window as constrained by the beam diameter (plus a small tolerance to allow for mirror edge effects and a small gap between the mirror and window to avoid mechanical contact). The close proximity of the mirror to the window reduces the optical path distance between mirror and window thereby reducing the beam wander at the window as the measuring instrument views at different angles. This reduces the window size that is needed to accommodate viewing over any finite range of viewing angles.

Methods and apparatus which incorporate the features described above and which are effective to function as described above constitute further, specific objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view showing one application of the method and apparatus of the present invention. In FIG. 1 the method and apparatus for processing radiation information is shown mounted in an interceptor vehicle which has a window for viewing a target to be intercepted.

FIG. 2 is a side elevation view of a wedge window constructed in accordance with one embodiment of the present invention. The wedge-shaped window shown in FIG. 2 has a wedge shape configured with respect to the angle of the incoming radiation so that the radiation exits the wedge-shaped window at an exitance angle which is smaller than the incidence angle at which the radiation enters the wedge-shaped window.

FIG. 3 is a side elevation view like FIG. 2 but shows a flat, non wedge-shaped window of a kind which has been used in the prior art for receiving and transmitting radiation information through the window. With the flat window structure shown in FIG. 3 the exitance angle is equal to the incidence angle. The flat window of the prior art as shown in FIG. 3 requires a larger window for unvignetted viewing (at large angles of incidence) through the window than the wedge window of the present invention shown in FIG. 2.

FIG. 4 is an end view of an orthogonal reflection pointing mirror system constructed in accordance with one embodiment of the present invention.

FIG. 5 is a side elevation view taken along the line and in the direction indicated by the arrows 5—5 in FIG. 4.

FIG. 6 is an isometric view of a wedge window and orthogonal reflection pointing mirror system to provide a compact system for viewing through a window over a wide range of viewing angles, including large incidence angles.

DETAILED DESCRIPTION OF THE PREFERRED EMBODIMENTS

FIG. 1 is an isometric view showing one application of the method and apparatus of the present invention.

In FIG. 1 the method and apparatus for processing radiation information is shown mounted in an interceptor vehicle 21 which has a window 23 for viewing a target 25 to be intercepted.

FIG. 1 illustrates how the radiation information 27 (regarding the target 25 to be intercepted) may be received at the window 23 at small angles of inclination with respect to the window. This small angle of inclination (which is a large angle of incidence as measured by a line normal to the outer surface of the window 23) presents a number of problems in processing the radiation information.

For example, the small angle of inclination can require a relatively large window size; because, for any optical instrument with finite aperture size to view through the window without vignetting, the required window clear aperture is proportional to the sine of the exitance angle.

With a prior art flat window (as illustrated in FIG. 3) the exitance angle is equal to the incidence angle.

Thus, when the incoming radiation is at a large incidence angle on the prior art, FIG. 3 window, the exitance angle is also a large angle; and a relatively large window is required for unvignetted viewing.

In many applications large window sizes are undesirable; and in some applications, such as, for example, the endoatmospheric interceptor application shown in FIG. 1, a small window size at large incidence angles is essential for packaging considerations and to limit cooling requirements.

The present invention provides a wedge window construction which changes the direction of radiation passing through the wedge window to shorten the window required for unvignetted viewing.

As illustrated in FIG. 2, the window 23 is wedge-shaped window having a first flat window surface 29 and a second flat window surface 31. The wedge shape is configured with respect to the inclination of the incoming radiation 27 so that the thickness of the window decreases linearly with increasing distance from the thicker end of the window.

Thus, the left hand end 33 of the window 23 (as viewed in FIG. 2) has a greater thickness than the right hand end 35 of the window so that the thickness of the window decreases linearly with increasing distance from the thicker end of the window.

The radiation 27 incident upon the flat window surface 29 in the direction of decreasing thickness of the window is caused to exit the second flat window surface 31 at an exitance angle which is smaller than the incidence angle at which the radiation enters the first flat window surface 29.

This changes the direction of radiation passing through the window and also increases the amount of the change of direction as the angle of incidence on the first flat window surface 29 is increased.

The wedge angle for any specific application is sized to balance the smaller window size with other effects of the wedge, such as, for example, chromatic aberration and angular demagnification.

FIGS. 4 and 5 illustrate another feature of the present invention which enables the size of the window to be reduced. These figures show an orthogonal reflection pointing mirror which reduces the window size that is required for unvignetted viewing through the window over a finite range of viewing angles.

FIG. 4 is an end view of the orthogonal reflection pointing mirror.

FIG. 5 is a side elevation view of the orthogonal reflection pointing mirror shown in FIG. 4. FIG. 5 is taken along the line and in the direction indicated by the arrows 5—5 in FIG. 4.

The mirror system shown in FIG. 4 comprises a pointing mirror 37.

The pointing mirror 37 is mounted for rotation about a rotation axis 41.

The pointing mirror is tilted forty-five degrees to the incident radiation and reflects the radiation orthogonally at a ninety degree angle of reflection of the reflected radiation with respect to the incident radiation.

The reflected radiation is reflected in a direction parallel to the rotation axis 41 of the mirror 37 so that the pointing mirror 37 is always oriented forty-five degrees to the incident and reflected radiation, even as the pointing mirror 37 rotates about the axis 41 (which axis is perpendicular to the incident radiation, see FIG. 4) to provide different viewing angles.

The constant forty-five degree orientation of the pointing mirror 37 relative to the incident and reflected radiation allows the mirror to be located as close as possible to the window 23. This reduces the optical path distance between the pointing mirror 37 and the window 23 thereby reducing the beam wander at the window as the measuring instrument views at different angles.

This reduces the size of the window 23 that is needed to accommodate viewing over any finite range of viewing angles.

The orthogonal reflection pointing mirror 37 reflects the radiation to the measuring instrument either directly or (as shown in FIG. 4) via one (or more) fixed mirrors 39 to facilitate packaging.

The pointing mirror 37 provides pointing in a single plane perpendicular to the rotation axis 41.

Pointing perpendicular to this plane can be provided with a second rotation axis, oriented perpendicular to the rotation axis 41. However, any rotations about a second axis should be small, since such rotations will increase the required separation distance between the pointing mirror 37 and the window 23 and hence the required window size.

One embodiment of the present invention which incorporates such a second rotation axis is shown in FIG. 6 where the second rotation axis is indicated by the reference numeral 43.

FIG. 6 also shows the orthogonal reflection pointing mirror used in combination with a wedge window 23.

The combination of the orthogonal reflection mirror 37 with the wedge window feature as illustrated in FIG. 6 significantly shortens the window required for unvignetted viewing over a finite range of viewing angles that includes large incidence angles.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An orthogonal reflection pointing mirror and window combination for reducing the window size that is required for unvignetted viewing through the window over a finite range of viewing angles, said combination comprising, a viewing window having an input and an output and operable to receive radiation to be viewed over a finite range of incidence angles, and operable to transmit the received radiation through the output, a pointing mirror disposed closely adjacent to the output of the viewing window, rotation means mounting the pointing mirror for rotation on a rotation axis for a constant forty-five degrees of tilt with respect to the direction of radiation transmitted through the output of the viewing window for all angles of incidence of said radiation in said finite range of incidence angles, whereby the pointing mirror reflects the radiation orthogonally through ninety degrees in a direction parallel to the rotation axis of the pointing mirror even as the pointing mirror is rotated to provide different viewing angles.

2. The invention defined in claim 1 including second rotation means mounting the pointing mirror for rotation on a second rotation axis.

3. A wedge window and orthogonal reflection pointing mirror system comprising, a wedge window comprising, a first flat window surface, a second flat window surface spaced from said first flat window surface, a wedge between said first and second surfaces so that one end of the window has a greater thickness than the other end of the window and so that the thickness of the window decreases linearly with increasing distance from the thicker end of the window, whereby radiation incident upon said first flat window surface in the direction of decreasing thickness of the window is caused to exit the second flat window surface at an exitance angle which is smaller than the incidence angle at which the radiation enters the first flat window surface thereby to change said direction of radiation passing through the window and also to increase the amount of said change as the angle of incidence on said first flat window surface is increased, a pointing mirror disposed closely adjacent to the output surface of the wedge window, rotation means mounting the pointing mirror for a constant forty-five degrees of tilt with respect to the direction of radiation transmitted through the output surface of the wedge window, whereby the pointing mirror reflects the radiation orthogonally through ninety degrees in a direction parallel to the rotation axis of the pointing mirror even as the pointing mirror is rotated to provide different viewing angles.

4. A method of processing radiation information which is received at large angles of incidence with respect to a window and an associated pointing mirror system, said method comprising, receiving and transmitting the radiation through a wedge-shaped window having the wedge shape configured with respect to the direction of the incoming radiation so that the radiation exits the wedge-shaped window at an exitance angle which is smaller than the incidence angle at which the radiation enters the wedge-shaped window, positioning a pointing mirror to receive and to reflect the radiation transmitted through the wedge-shaped window, rotating the pointing mirror about a rotation axis which provides a constant forty-five degrees of tilt of the pointing mirror with respect to the direction of radiation transmitted through the wedge-shaped window whereby the pointing mirror reflects the radiation orthogonally through ninety degrees in a direction parallel to the rotation axis even as the pointing mirror is rotated to provide different viewing angles.

\* \* \* \* \*